June 5, 1962  W. M. THOMPSON  3,037,446
SHEARING MACHINE
Filed Dec. 3, 1959  3 Sheets-Sheet 1

INVENTOR
WALLACE M. THOMPSON
BY Cushman, Darby & Cushman
ATTORNEYS

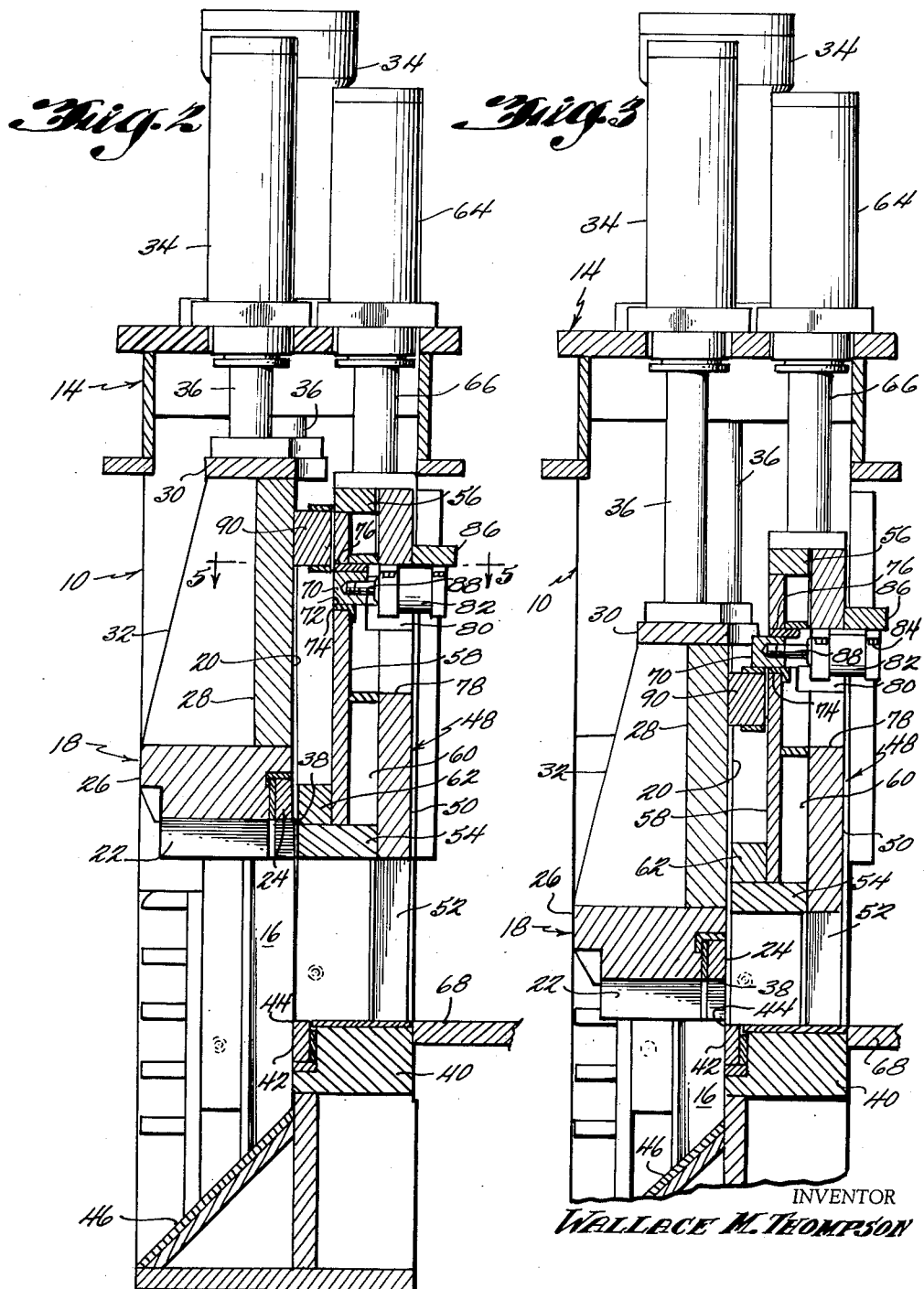

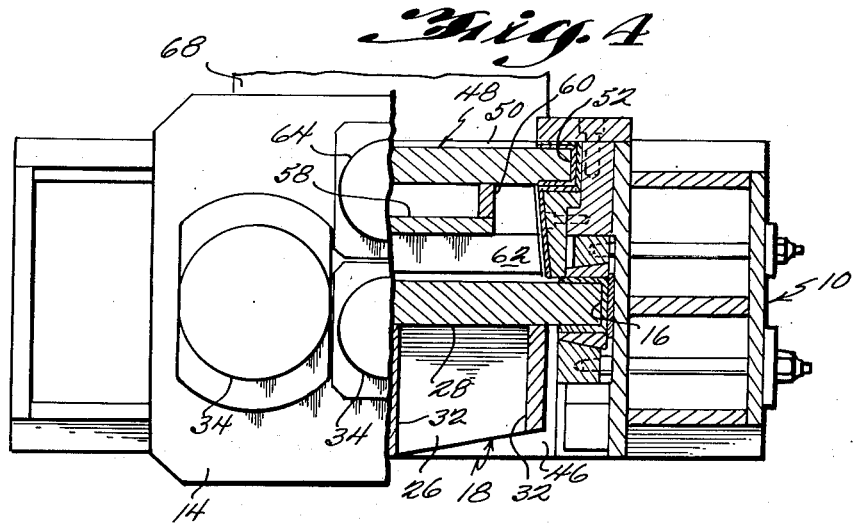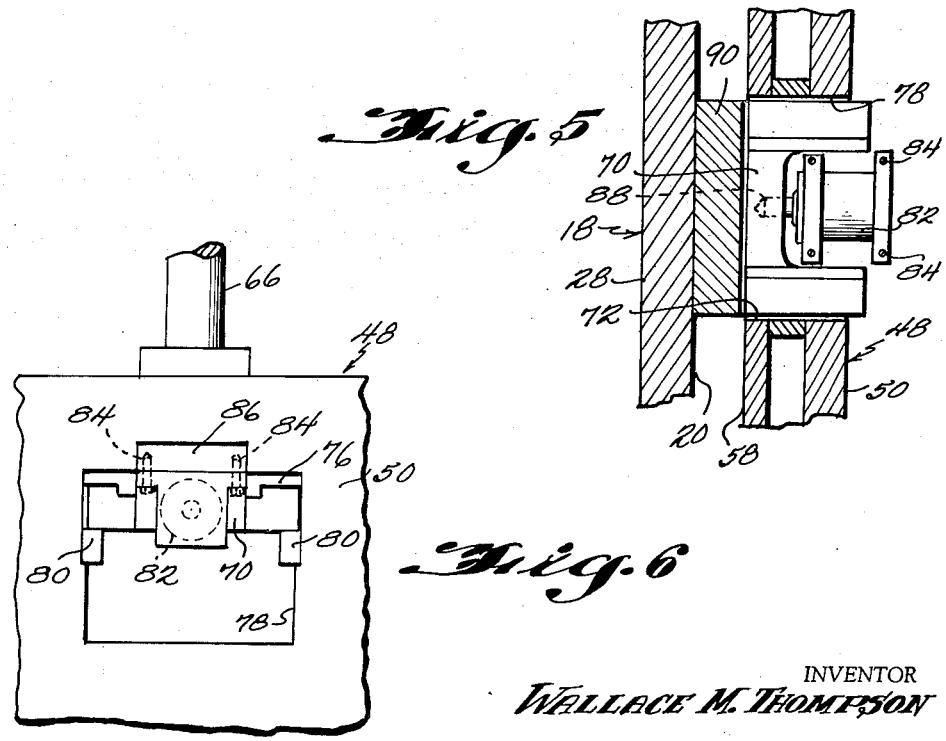

3,037,446
SHEARING MACHINE
Wallace M. Thompson, Cordele, Ga., assignor to Harris Foundry & Machine Company, Cordele, Ga., a corporation of Georgia
Filed Dec. 3, 1959, Ser. No. 857,071
10 Claims. (Cl. 100—98)

This invention relates to shears or shearing machines, and, more particularly, to an improved scrap metal shear having an additional function of compacting or crushing scrap to be sheared therein.

Sheet metal scrap, such as automobile bodies, structural elements, pipe, and the like, frequently is cut up in a shearing machine in order to facilitate handling and transport of such scrap. Some metal scrap, automobile scrap being a good example, is quite bulky, so that even after being cut into relatively small pieces, the cut-up scrap still is not of a very desirable relatively high density. Consequently, it is desirable to have such bulky metal scrap compacted or crushed before being sheared so as to provide a high density in the cut scrap.

By means of this invention, the desired compacting or crushing of bulky metal scrap can be accomplished by the same machine employed to cut up the scrap. In conventional scrap metal shears there are two separate instrumentalities, one for shearing the scrap and another for clamping or holding down the scrap being sheared. These two instrumentalities are operated by separate motors, but in accordance with this invention means are provided whereby all of the motors can be employed to operate either instrumentality, thereby not only increasing the force available to shear metal scrap but also increasing the force available to hold-down the scrap sufficiently to crush the same.

Accordingly, it is an object of this invention to provide an improved shearing machine having an improved work hold-down clamping structure, the clamping force of which can be greatly increased by use of the shearing motors in order to crush scrap prior to being sheared.

Additionally, it is another object of this invention to provide an improved shearing machine wherein the shearing force of the same can be increased by use of the hold-down clamp motors.

It is a further object of this invention to provide an improved shearing machine having the aforedescribed characteristics but which is relatively inexpensive to construct and simple to operate.

Other objects and advantages of the invention will become apparent from the following description and accompanying drawings in which:

FIGURE 2 is a vertical sectional view of the machine shown in FIGURE 1.

FIGURE 3 is a view corresponding to FIGURE 2 but illustrating the position of the parts when the work hold-down clamp motor is employed to augment the shearing force of the machine.

FIGURE 4 is a plan view, partly in section, taken substantially on the line 4—4 of FIGURE 1.

FIGURE 5 is a fragmentary horizontal sectional view taken substantially on the line 5—5 of FIGURE 2.

FIGURE 6 is a fragmentary rear elevational view of the portion of the machine shown in FIGURE 5.

Figure 1:
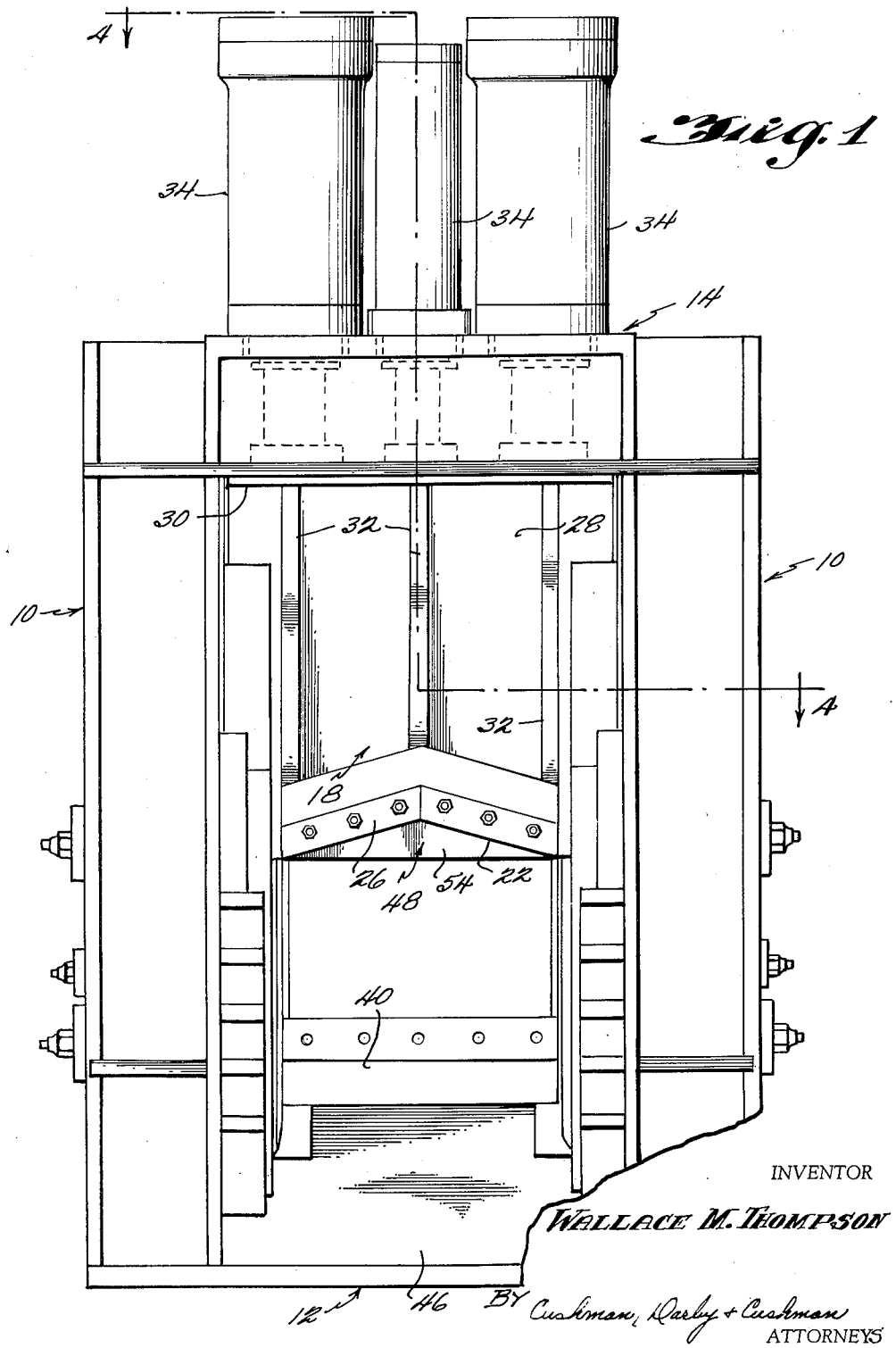
FIGURE 1 is a front elevational view of a shear embodying this invention.

Referring now to the drawings there is shown a scrap metal shear having a frame composed of spaced upright side members 10 interconnected by a bottom member 12 and a top member 14, all of such members being formed by suitably re-enforced assemblies. Vertically movable in guideways 16 on the inner sides of the side frame members 10 is a shearing head or movable blade structure 18 having a flat rear face 20 and a lower face 22 in the shape of an inverted V of large obtuse included angle, as best shown in FIGURE 1. Secured to the lower and inner edge of the head 18 is a movable blade 24 which may be formed in two parts, each secured along that portion of the edge which defines one of the legs of the V. The shearing head 18 includes a lower cross member 26 which carries the two-part blade 24, a plate-like member 28 which extends upwardly from the cross-member immediately above the blade 24 and has its lateral edges received in the guideways 16, an upper cross member 30, and a plurality of upright stiffening and strengthening ribs or web plates 32 extending between the upper and lower members 30 and 26 in front of the member 28. Mounted on top of the top frame member 14 are several, three being illustrated by way of example, double-acting hydraulic motors 34 having their piston rods 36 connected to the upper member 30 of the shearing head 18 for moving the latter vertically in its guideways 16.

Extending between the side frame members 10, somewhat above the bottom frame member 12 and only very slightly rearwardly of the vertical plane of movement of the cutting edge 38 of the movable blade 24, is a transverse bed member 40. Secured to the upper forward edge of the bed member 40 is a fixed blade 42 having a straight cutting edge 44 adapted to cooperate with the cutting edge 38 of the movable blade 24 in order to shear scrap resting on the bed 40 and projecting forwardly beyond the fixed blade. In front of the bed 40, and located therebelow, is a downwardly and forwardly inclined plate 46 constituting a chute for cut scrap.

Mounted for vertical movement above the bed 40 is a work hold-down clamp structure 48 which includes an upright back plate 50 having its lateral edges received in vertical guideways 52 in the inner sides of the side frame members 10, bottom and top cross members 54 and 56 in front of the back plate 50, an upright front plate 58 extending between the cross members 54 and 56 in spaced parallel relation to the back plate 50, side members 60, and a bottom reinforcing member 62 on top of the front edge of the bottom cross member 54. Another double-acting hydraulic motor 64 is mounted on top of the top frame member 14 and has the lower end of its piston rod 66 connected to the upper end of the work hold-down clamp 48 in order to reciprocate the same vertically in its guideways 52. The front edges of the bottom members 54 and 62 are closely adjacent the rear face 20 of the shearing head 18, while the front plate 58 and top cross member 56 are spaced from such rear face 20.

The structure thus far described is relatively conventional in that it is not new to provide shearing machines with work hold-down clamps. Scrap to be sheared is fed onto the bed 40 from the rear of the machine, usually being pushed thereonto across a work table 68 which, in some instances, may constitute the bottom of a charging box (not shown). When such scrap projects a selected distance forwardly of the fixed blade 42, the work hold-down clamp 48 is moved down by its motor 64 to firmly hold the scrap against the bed 40. Simultaneous with the movement of the clamp 48, or later, the shearing head 18 is moved down by its motors 34 and shears off the forwardly projecting part of the scrap by the shearing action of the movable cutting blade 24 in cooperation with the fixed blade 42.

The improvement in the shear resides in the provision of means on the head 18 and on the clamp 48 for selectively engaging one with the other in the direction of their downward i.e., operating movement. Such means includes a horizontal plate-like abutment member or bolt 70 that is movably carried by the work hold-down clamp 48 in a substantially rectangular horizontal bolt-receiving aperture 72 in the front plate 58. Preferably, liner plates 74 and 76 are secured along the lower and upper edges of the aperture 72. The back plate 50 likewise is provided with a rectangular aperture 78 registering with the aperture 72 but of greater depth than the latter. Guide blocks 80 for the undersurface of the lateral edges of the bolt 70 are secured to the sides of the aperture 78 while the upper liner plate 76 for the aperture 72 is extended rearwardly at its lateral sides to serve as guides for the upper surface of the lateral edges of the bolt 70 within the aperture 78 in the back plate 50.

As will be seen from the showing of FIGURES 2, 3 and 5 of the drawings, the forward face of the abutment member or bolt 70 is movable from a position wherein it is substantially flush with the forward face of the front plate 58, as shown in FIGURE 2, into a position wherein the abutment member 70 projects outwardly beyond such forward face, as shown in FIGURE 3. Preferably, movement of the bolt 70 between the two aforedescribed positions is accomplished by power and, for this purpose, the abutment plate 70 is centrally cut away at its rearward edge so that the plate is substantially U-shaped in plan view, as shown in FIGURE 5. A double-acting hydraulic motor 82 is secured, as by screws 84 passing through attaching brackets on the motor, to the upper edge of the opening 78 in the back plate 50 and also to a motor supporting block 86 projecting from and secured to the back plate adjacent the upper edge of the opening 78. The end of the piston rod 88 of the motor 82 may be threaded into a tapped aperture in the abutment member 70, or otherwise appropriately fastened thereto.

Projecting from the back face 20 of the shearing head 18 is a horizontally extending abutment plate 90 which may be provided on its upper and lower surfaces with wear plates. The plate 90 is so positioned that when both the shearing head 18 and the work hold-down clamp 48 are in their uppermost positions, as shown in FIGURE 2, the undersurface of the shearing head abutment plate 90 is slightly above the upper edge of the abutment member 70. Consequently, when the bolt 70 is projected forwardly, the undersurface of the shearing head plate 90 can engage the top of the bolt 70, so that the full power of the hydraulic shearing motors 34 can be employed to augment the power of the clamp motor 64 to move the work hold-down clamp 48 downwardly. It also will be seen, from an inspection of FIGURE 3, that when the shearing head 18 is moved downwardly a sufficient distance relative to the work hold-down clamp 48, the bolt 70 on the latter can be projected forwardly into a position where it can engage the upper surface of the abutment plate 90 on the shearing head 18 so that the power of the clamp motor 64 can be employed to augment the power of the shearing motor 34 to move the head 18 downwardly.

In operating the shear to crush scrap, the latter is pushed across the table 68 beneath the work hold-down clamp 48, and the latter moved down to crush the scrap against the bed 40. At the same time, the bolt 70 is projected and the shearing head 18 moved down so that its abutment plate 90 engages the bolt and the full power of the shearing motors 34 is added to that of the clamp motor 64 to increase the crushing force of the work hold-down clamp 48. After the scrap has been thus crushed, the shearing head 18 is raised slightly or the pressure of the shearing motors 34 merely relieved, so that the bolt 70 can be retracted. Thereupon, while the work hold-down clamp 48 is still holding down the crushed scrap, the shearing head 18 is moved downwardly its full distance in order to cut off the scrap projecting beyond the fixed blade 42.

In the event that the shearing motors 34 do not develop sufficient force to cut the crushed and compacted scrap projecting beyond the fixed blade 42, while the movable blade 24 is still engaged with the scrap the work hold-down clamp 48 is raised until the bolt 70 can be projected above the abutment plate 90 on the shearing head 18. The clamp 48 is then moved down to engage the bolt 70 with the top of the plate 90 so that the power of the clamp motor 64 is added to that of the shearing motors 34 in order to increase the shearing force of the head 18 on the scrap.

It thus will be seen that the objects of this invention have been fully and effectively accomplished. It will be realized, however, that the foregoing specific embodiment has been shown and described only for the purpose of illustrating the principles of this invention and is subject to extensive change without departure from such principles. Therefore, this invention includes all modifications encompassed within the spirit and scope of the following claims.

I claim:

1. A shearing machine comprising: a frame; a fixed blade mounted to said frame; a movable blade structure carried by said frame for movement toward and away from said fixed blade to shear work therebetween; motor means for moving said movable blade structure; a work hold-down clamp structure carried by said frame for movement toward and away from said fixed blade parallel to said movable blade structure; and means including a downwardly facing abutment surface on said movable blade structure releasably engageable with an upwardly facing abutment surface on said clamp structure over an extended area of contact for augmenting the crushing force of said clamp motor means by said movable blade motor means.

2. A shearing machine comprising: a frame; a fixed blade mounted to said frame; a movable blade structure carried by said frame for movement toward and away from said fixed blade to shear work therebetween; motor means for moving said movable blade structure; a work hold-down clamp structure carried by said frame for movement toward and away from said fixed blade parallel to said movable blade structure; motor means for moving said clamp structure independently of said movable blade structure; and means including a downwardly facing abutment surface on said clamp structure releasably engageable with an upwardly facing abutment surface on said movable blade structure over an extended area of contact for augmenting the shearing force of said movable blade motor means by said clamp motor means.

3. A shearing machine comprising: a frame; a fixed blade mounted to said frame; a movable blade structure carried by said frame for movement toward and away from said fixed blade to shear work therebetween; motor means for moving said movable blade structure; a work hold-down clamp structure carried by said frame for movement toward and away from said fixed blade parallel to said movable blade structure; motor means for moving said clamp structure independently of said movable blade structure; and selectively operable means including a downwardly facing surface on said movable blade structure releasably engageable with an upwardly facing abutment surface on said clamp structure over an extended area of contact and a downwardly facing abutment surface on said clamp structure releasably engageable with an upwardly facing abutment surface on said movable blade structure over an extended area of contact in order to augment the crushing force of said clamp motor means by said movable blade motor means or in order to augment the shearing force of said movable blade motor means by said clamp motor means.

4. A shearing machine comprising: a frame; a fixed blade mounted to said frame; a movable blade structure carried by said frame for movement toward and away from said fixed blade to shear work therebetween; motor means for moving said movable blade structure; a work hold-down clamp structure carried by said frame for movement toward and away from said fixed blade parallel to said movable blade structure; motor means for moving said clamp structure independently of said movable blade structure; an abutment on said movable blade structure facing said clamp structure; and an abutment on said clamp structure facing said movable blade structure, one of said abutments being mounted to its structure for movement toward and away from the other structure so as to position said movable blade structure abutment in overlapping relation with said clamp structure abutment for engagement therebetween over an extended area of contact as said movable blade structure moves toward said fixed blade so that said movable blade motor means will augment the power of said clamp motor means.

5. A shearing machine comprising: a frame; a fixed blade mounted to said frame; a movable blade structure carried by said frame for movement toward and away from said fixed blade to shear work therebetween; motor means for moving said movable blade structure; a work hold-down clamp structure carried by said frame for movement toward and away from said fixed blade parallel to said movable blade structure; motor means for moving said clamp structure independently of said movable blade structure; an abutment on said movable blade structure facing said clamp structure; and an abutment on said clamp structure facing said movable blade structure, one of said abutments being mounted to its structure for movement toward and away from the other structure so as to position said clamp structure abutment in overlapping relation with said movable blade structure abutment for engagement therebetween over an extended area of contact as said clamp structure moves toward said fixed blade so that said clamp motor means will augment the power of said movable blade motor means.

6. A shearing machine comprising: a frame; a fixed blade mounted to said frame; a movable blade structure carried by said frame for movement toward and away from said fixed blade to shear work therebetween; motor means for moving said movable blade structure; a work hold-down clamp structure carried by said frame for movement toward and away from said fixed blade parallel to said movable blade structure; motor means for moving said clamp structure independently of said movable blade structure; means defining a pair of substantially flat abutment surfaces on said movable blade structure adjacent said clamp structure, said surfaces facing oppositely and away from each other and extending generally normal to the direction of movement of said movable blade structure; and means defining a pair of substantially flat abutment surfaces on said clamp structure adjacent said movable blade structure, said last-mentioned surfaces facing oppositely and away from each other and extending generally normal to the direction of movement of said clamp structure, one of said defining means being movable toward and away from the other structure to move its surfaces into overlapping relation with those of the other defining means so as to selectively engage an abutment surface on one structure with an abutment surface on the other with an extended area of contact therebetween, as said one structure moves toward said fixed blade.

7. The structure defined in claim 6 in which the abutment surfaces on the movable blade are fixed thereto and which structure includes a reciprocating fluid pressure motor mounted to the clamp structure for moving the abutment surfaces thereon.

8. In a shearing machine having a fixed blade, movable blade means, means for moving the movable blade means, and work hold-down means adjacent the movable blade means and movable parallel thereto, the combination of means including a downwardly facing abutment surface on the movable blade means releasably engageable with an upwardly facing abutment surface on the hold-down means over an extended area of contact for augmenting the crushing force of the work hold-down means by the movable blade means.

9. In a shearing machine having a fixed blade, movable blade means, means for moving the movable blade means, work hold-down means adjacent the movable blade means and movable parallel thereto and independently thereof, and means for moving the hold-down means, the combination of means including a downwardly facing abutment surface on the hold-down means releasably engageable with an upwardly facing abutment surface on the movable blade means over an extended area of contact for augmenting the shearing force of the movable blade means by the hold-down means.

10. In a shearing machine having a fixed blade, movable blade means, means for moving the movable blade means, work hold-down means adjacent the movable blade means and movable parallel thereto and independently thereof, and means for moving the hold-down means, the combination of selectively operable means including a downwardly facing abutment surface on the movable blade means releasably engageable with an upwardly facing abutment surface on the hold-down means over an extended area of contact and a downwardly facing abutment surface on the hold-down means releasably engageable with an upwardly facing abutment surface on the movable blade means over an extended area of contact for augmenting the crushing force of the hold-down means by the movable blade means or augmenting the shearing force of the movable blade means by the hold-down means.

References Cited in the file of this patent

UNITED STATES PATENTS

| Re. 23,892 | Macewka | Nov. 2, 1954 |
| 2,540,836 | Seybold | Feb. 6, 1951 |
| 2,605,837 | Cahen | Aug. 5, 1952 |

FOREIGN PATENTS

| 201,976 | Austria | July 15, 1958 |